United States Patent
Jin et al.

(10) Patent No.: US 10,409,153 B2
(45) Date of Patent: Sep. 10, 2019

(54) PATTERN SORTING METHOD USED IN OPC VERIFICATION

(71) Applicant: SHANGHAI HUAHONG GRACE SEMICONDUCTOR MANUFACTURING CORPORATION, Shanghai (CN)

(72) Inventors: Xiaoliang Jin, Shanghai (CN); Chunyu Yuan, Shanghai (CN)

(73) Assignee: Shanghai Huahong Grace Semiconductor Manufacturing Corporation, Shanghai (CN)

( * ) Notice: Subject to any disclaimer, the term of this patent is extended or adjusted under 35 U.S.C. 154(b) by 71 days.

(21) Appl. No.: 15/850,878

(22) Filed: Dec. 21, 2017

(65) Prior Publication Data

US 2018/0314146 A1 Nov. 1, 2018

(30) Foreign Application Priority Data

Apr. 27, 2017 (CN) .......................... 2017 1 0285776

(51) Int. Cl.
  *G06F 17/50* (2006.01)
  *G03F 1/36* (2012.01)
(52) U.S. Cl.
  CPC .............. *G03F 1/36* (2013.01); *G06F 17/504* (2013.01); *G06F 2217/02* (2013.01)
(58) Field of Classification Search
  CPC .................................................. G06F 17/504
  (Continued)

(56) References Cited

U.S. PATENT DOCUMENTS

2005/0091632 A1 4/2005 Pierrat et al.
2006/0277520 A1* 12/2006 Gennari .................. G03F 7/706
  716/53

(Continued)

FOREIGN PATENT DOCUMENTS

CN 104950590 A 9/2015
CN 105988300 A 10/2016

OTHER PUBLICATIONS

First Office Action issued in corresponding Chinese Patent Application No. 201710285776.6, dated Apr. 15, 2019, 8 Pages.

(Continued)

*Primary Examiner* — Suchin Parihar
(74) *Attorney, Agent, or Firm* — MKG, LLC

(57) ABSTRACT

A pattern sorting method used in OPC verification, comprises the following steps: obtaining sizes of comparison areas of patterns and extracting pattern boundaries; processing pattern boundaries; cutting off all the pattern edges outside comparison areas; setting grid sizes for filtering; setting directions for pattern boundaries; pattern division processing: dividing each pattern into 4 blocks of an equal size; recalculating the apexes of pattern boundaries in each block; implementing coordinate transformation for each block; calculating block characteristic values for each block; implementing rotating, upward and downward mirroring or leftward and rightward mirroring adjustment for blocks in accordance with corresponding block characteristic values; calculating overall characteristic values of patterns in accordance with various block characteristic values. This method is capable of sorting patterns related to each other by rotations or mirroring as well as patterns having subtle differences between one another into the same categories of patterns, thereby reducing the number of verification results as well as difficulties in screening problems.

20 Claims, 6 Drawing Sheets

(58) Field of Classification Search
USPC .......................................................... 716/53
See application file for complete search history.

(56) References Cited

U.S. PATENT DOCUMENTS

2011/0059055 A1\* 3/2011 Goldman ............. C12N 5/0622
424/93.7
2011/0099526 A1\* 4/2011 Liu ......................... G03F 1/144
716/54
2016/0283617 A1\* 9/2016 Bailey ................. G06F 17/5009

OTHER PUBLICATIONS

Search Report issued in First Office Action from corresponding Chinese Patent Application No. 201710285776.6, 3 pages.

\* cited by examiner

US 10,409,153 B2

PATTERN SORTING METHOD USED IN OPC VERIFICATION

RELATED APPLICATION

The present application claims priority to Chinese patent application number 201710285776.6 filed on Apr. 27, 2017, which is incorporated by reference herein in its entirety.

TECHNICAL FIELD

This invention relates to a method of manufacturing semiconductor integrated circuits and it especially relates to a pattern sorting method used in Optical Proximity Correction (OPC) verification.

BACKGROUND OF INVENTION

In the process of printing masks for semiconductor manufacturing, it is generally necessary to use the OPC technology to correct mask-board patterns. The formation of images with OPC-corrected mask boards can enable the target pattern formed on the semiconductor substrate to meet the target requirements, and can eliminate the distortion or deformation in the target pattern arising from the optical proximity effect.

The OPC verification is required for OPC-corrected mask boards before they are published so as to simulate whether the OPC-corrected masks are correct. In the existing first type of OPC verification method, verification results are generally based on the name sorting of design cells.

As the size of the chip increases, the repetitive structures in different cells increase, and the repetitive structures in different positions of the same cell also increase. This results in repetitive occurrence of similar verification results. Over a dozen types of structures may repeatedly occur for over a thousand times in a relevant verification report, which results in difficulties of screening problems.

Although the above-mentioned circumstances can be avoided in the existing second type of OPC verification method based on patterning, the following problems still exist.

1. It is difficult for the second type of OPC verification method to distinguish the rotation or mirroring in patterns. As shown in FIG. 1A and FIG. 1B, FIG. 1B is merely a pattern generated by a 90-degree clockwise turning of FIG. 1A; the verification results of FIG. 1A and FIG. 1B should be identical. However, the second type of OPC verification method will verify these two patterns separately and obtain respective verification results.

2. There are often subtle differences between OPC patterns, but it is difficult for the existing second type of OPC verification method to distinguish these kind of subtle differences therein. As shown in FIG. 1A and FIG. 1C, these two patterns are similar to each other, and there are only subtle differences in the corners thereof, which will not affect the results of OPC verification. However, the second type of OPC verification method will still verify these two patterns separately and arrive at their verification results, respectively.

Therefore, the existing second type of OPC verification method is unable to distinguish the rotation or mirroring in patterns as well as subtle differences therein, which results in difficulties in screening problems with the increase of the number of verification results.

SUMMARY OF THE INVENTION

The technical problem to be solved by the present invention is to provide a pattern sorting method for OPC verification capable of sorting patterns related to each other by rotations or mirroring as well as patterns having subtle differences with one another into the same categories of patterns, thereby reducing the number of verification results as well as difficulties in screening problems.

In order to solve the above-mentioned technical problems, the pattern sorting method used in OPC verification as provided by present invention adopts the following steps to calculate the overall characteristic values of patterns and to implement the sorting of the patterns:

Step I, obtaining a size of the comparison area for the patterns and extracting pattern boundaries of the patterns within the comparison area.

Step II, processing the pattern boundaries within the comparison areas of the patterns, which includes the following substeps:

Substep 21, cutting off the edges of the patterns outside the comparison areas.

Substep 22, setting filtering granularity, so that the apexes of the boundaries of the patterns all move to the closest grid points with grid sizes that are multiples of the grid sizes; degenerating the grid points on the same straight line so as to filter all the deviations from grid sizes.

Substep 23, setting directions for the boundaries of the patterns in accordance with same rules.

Step III, partitioning the patterns subjected to pattern boundary processing, which includes the following substeps:

Substep 31, dividing the pattern into four equal blocks.

Substep 32, recalculating the apex of the boundary for each the pattern in each block in accordance with the result of partitioning.

Substep 33, for each block, implementing the coordinate transformation by taking the center of partitioning in Substep 31 as the origin and shift the corresponding block into the first quadrant.

Step IV, calculating the block characteristic value of each block subjected to coordinate transformation; the block characteristic value for each the block is calculated in accordance with the apex coordinate of each pattern boundary as well as by adopting the method of being divided by primes and taking remainder, with the block characteristic value for each block consisting of two componential values.

Step V, block adjustment, which includes: in accordance with the characteristic values of the blocks and based on the array structure of the blocks divided by Substep 31, implementing the rotation, upward and downward mirroring or leftward and rightward mirroring, so as to sorting patterns relate to each other by rotations or mirroring, as well as patterns having subtle differences with one another, into the same categories of patterns.

Step VI, based on the calculation of the block characteristic values, obtaining the overall characteristic values of the patterns subjected to block adjustments.

One further improvement is that the size of the comparison area of the patterns as obtained in Step I is obtained by taking the wrong point of OPC verification as the center.

One further improvement is that the comparison area of the patterns as obtained in Step I is a square or a rectangle obtained by taking the wrong point of OPC verification as the center.

One further improvement is that the size of the comparison area of the patterns as obtained in Step I is determined by different OPC (verification) models.

One further improvement is that the size of the comparison area of the patterns as obtained in Step I is the minimal rectangle containing the wrong point of OPC verification, plus a further outward extension of 1~2 μm.

One further improvement is that the grid size as mentioned in Substep 22 is set to be tens of nanometers.

One further improvement is that, in Substep 23 the direction from the initial boundary of the pattern to the interior of the pattern is right-to-left and all the other boundaries of the pattern will be extended along the same right-to-left direction; or the direction from the initial boundary of the pattern to the interior of the pattern is left-to-right and all the other boundaries of the pattern will be extended along the same left-to-right direction.

One further improvement is that the calculation of the characteristic values of the blocks in Step IV includes the following Substeps:

Substep 41, selecting the first prime and the second prime for division and remainder taking.

Substep 42, based on the starting point coordinates and the ending point coordinates of the pattern boundaries as well as the first prime and the second prime, calculating the characteristic values of the lines for the pattern boundaries in the blocks.

Substep 43, determining the number of the pattern boundaries for corresponding the blocks, and if there is only one line of the pattern boundaries, then the characteristic values of the line for this pattern boundary will be taken as the block characteristic values for the entire the block; if there are over two lines of the pattern boundaries, then proceed by following Substep 44.

Substep 44, arranging the pattern boundaries into sequences of lines in accordance with the rule as defined in Substep 23; by following the direction of the sequence of the lines, and in connection with the first prime and the second prime, successively incorporating the line characteristic values of the pattern boundaries of two adjacent lines into a single line characteristic value, and finally obtaining an overall line characteristic value and taking this overall line characteristic value as the block characteristic value of the entire block.

One further improvement is that the calculation of the line characteristic values of the pattern boundaries as mentioned in Substep 42 is made by following the following formulae:

$$E1=[(X1+X2+a11\times(Y1+Y2)+a12+X1)\times(Y1+Y2+a13\times(X1+X2)+a14+Y1)]\%P;$$

$$E2=[(Y1+Y2+a15\times(Y1+Y2)+a16+X2)\times(Y1+Y2+a17\times(X1+X2)+a18+Y2)]\%Q;$$

wherein E1 represents the first componential value of the line characteristic value; E2 represents the second componential value of the line characteristic value; P represents the first prime; Q represents the second prime; X1 represents horizontal ordinate of the starting point for the corresponding line; Y1 represents vertical ordinate of the starting point for the corresponding line; X2 represents horizontal ordinate of the ending point for the corresponding line; Y2 represents vertical ordinate of the ending point for the corresponding line; a11, a12, a13, a14, a15, a16, a17 and a18 are all primes, different from one another, smaller than either of the first prime and the second prime.

One further improvement is that the specific steps of incorporating the line characteristic values of the pattern boundaries of two adjacent lines into a single line characteristic value in accordance with Substep 44 include:

The E1 and E2 values of the front pattern boundary are taken as X1 and Y1, respectively. The E1 and E2 values of the rear pattern boundary are taken as X2 and Y2, respectively. The above converted X1, Y1, X2 and Y2 are plugged into the following formulae:

$$E1=[(X1+X2+a21\times(Y1+Y2)+a22+X1)\times(Y1+Y2+a23\times(X1+X2)+a24+Y1)]\%P;$$

$$E2=[(Y1+Y2+a25\times(Y1+Y2)+a26+X2)\times(Y1+Y2+a27\times(X1+X2)+a28+Y2)]\%Q;$$

wherein E1 represents the first componential value of the line characteristic value after incorporation; E2 represents the second componential value of the the line characteristic value after incorporation; a21, a22, a23, a24, a25, a26, a27 and a28 are all primes, different from one another, smaller than either of the first prime and the second prime; the values of a21, a22, a23, a24, a25, a26, a27 and a28 are all different from those of a11, a12, a13, a14, a15, a16, a17 and a18, respectively.

One further improvement is that in calculating the overall characteristic value of the pattern as mentioned in Step VI, one of the four blocks is taken as the starting block; by following the clockwise direction, and in connection with the first prime and the second prime, the block characteristic values of two adjacent blocks are successively incorporated into a single block characteristic value; and finally an overall the block characteristic value is obtained to be as the overall characteristic value of the pattern.

In calculating the overall characteristic value of the pattern as mentioned in Step VI, one of the four blocks is taken as the starting block; by following the anticlockwise direction, and in connection with the first prime and the second prime, the block characteristic values of two adjacent blocks are successively incorporated into a single block characteristic value; and finally an overall block characteristic value is obtained to be as the overall characteristic value of the pattern.

One further improvement is that the steps of incorporating the block characteristic values of two adjacent blocks into a single block characteristic value as mentioned in Step VI are the same as those of incorporating the line characteristic values of the pattern boundaries of two adjacent lines into a single line characteristic value as mentioned in Substep 44.

One further improvement is that both the first prime and the second prime as mentioned in Substep 41 are 12-digit, decimal and large primes.

One further improvement is that the block adjustment as mentioned in Step V comprises the following substeps:

Substep 51, the four blocks divided in accordance with and Substep 31 are the upper left block, upper right block, bottom right block and bottom left block, respectively. The first row value is derived by adding the block characteristic values of both the upper left block and the upper right block, being divided by prime and taking the remainder; the second row value is derived by adding the block characteristic values of both the bottom left block and the bottom right block, being divided by prime and taking the remainder; the first column value is derived by adding the block characteristic values of both the upper left block and the bottom left block, being divided by prime and taking the remainder; the second column value is derived by adding the block characteristic values of both the upper right block and the bottom right block, being divided by prime and taking the remainder.

Substep 52, if the smaller value of both the first row value and the second row value is greater than the smaller value of both the first column value and the second column value, then an anticlockwise rotation for the 4 blocks divided by following Substep 31 is implemented; or if the smaller value of both the first row value and the second row value is greater than the smaller value of both the first column value and the second column value, then a clockwise rotation for the 4 blocks is implemented;

Substep 53, if the first row value is smaller than the second row value, then an upward and downward mirroring transformation for the 4 blocks is implemented; or if the first row value is greater than the second row value, then an upward and downward mirroring transformation for the 4 blocks is implemented;

Substep 54, if the first column value is smaller than the second column value, then a leftward and rightward mirroring transformation for the 4 blocks is implemented; or if the first column value is greater than the second column value, then a leftward and rightward mirroring transformation for the 4 blocks is implemented.

A further improvement is that the patterns with the same overall characteristic values are classified into a same type of patterns; the OPC verification is implemented based on the patterns sorted in accordance with their overall characteristic values, and an OPC verification is implemented for a same type of patterns.

According to the present invention, the patterns within the same comparison areas are extracted, and the subtle differences of the patterns can be filtered by setting grid size, and finally all the patterns with subtle differences have the same overall characteristic values, so as to realize sorting patterns and patterns with subtle differences into a same type of patterns.

According to the present invention, the pattern within the same comparison area are divided into four equal blocks, and the block characteristic values of the blocks can be obtained according to the coordinates of the lines of the blocks i.e. the coordinates of the pattern boundaries in combination with the method of being divided by primes and remainder taking; the block is adjusted according to the block characteristic values of the blocks, thereby the patterns relate to each other by rotations or mirroring to become identical after block adjustment; and then the patterns relate to each other by rotations or mirroring are sorted into a same category.

After the block adjustment, both patterns relate to each other by rotations and mirroring and patterns with subtle differences to one another are sorted into same categories of patterns. That is to say, after the operation of this invention, the same patterns after being processed by the block adjustment will be obtained from either the patterns with subtle differences to one another or the patterns relate to each other by rotations or mirroring, and finally a same overall characteristic value will be obtained.

It can been seen from above that this invention is capable of sorting patterns relate to each other by rotations or mirroring as well as patterns having subtle differences with one another into a same category of patterns, using the same overall characteristic value to represent patterns relate to each other by rotations or mirroring as well as patterns having subtle differences with one another, implementing the OPC verification by merely focusing on the patterns sorted in accordance with overall characteristic values, implementing the OPC verification for only one time for the same type of patterns and obtaining only one result of OPC verification, thereby reducing the number of results of OPC verification as well as reducing difficulties in screening relevant problems.

BRIEF DESCRIPTION OF THE DRAWINGS

Further explanations in detail are made as follows in connection with the attached drawings and specific embodiments of the invention.

DETAILED DESCRIPTION

Figure 1A:
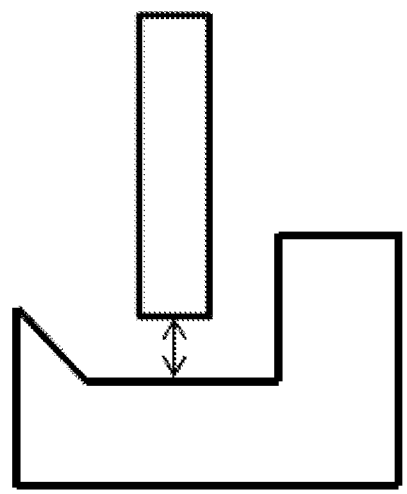
FIG. 1A is a schematic diagram of a type of chip patterns.
Figure 1B:
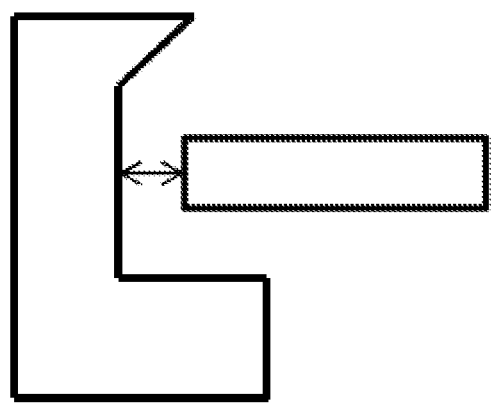
FIG. 1B is a schematic diagram for a rotated pattern of FIG. 1A.
Figure 1C:
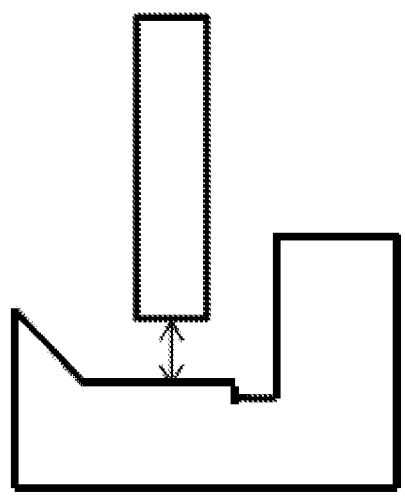
FIG. 1C is a schematic diagram for a pattern with subtle differences from FIG. 1A.
Figure 2:
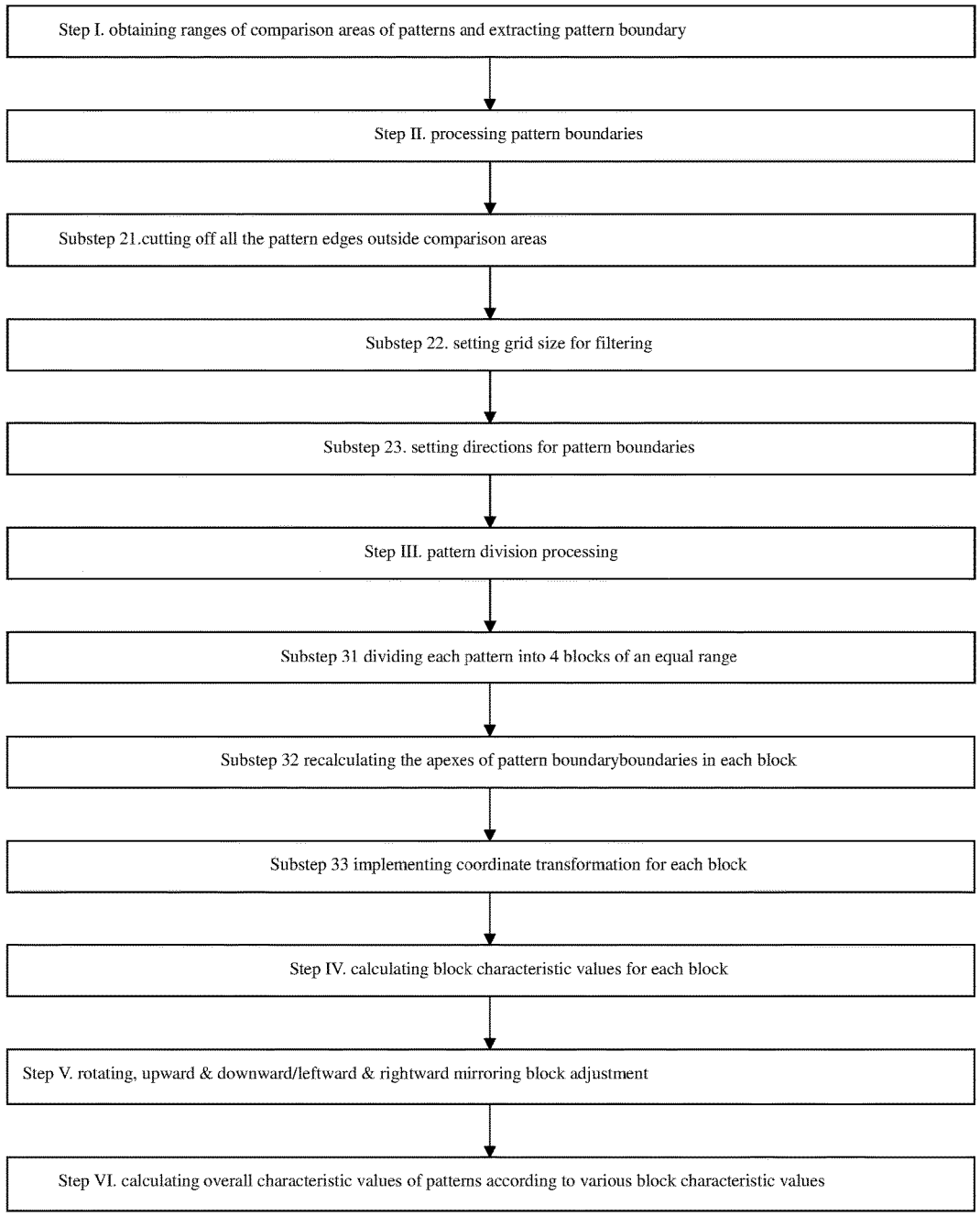
FIG. 2 is a schematic diagram for the flowchart of an embodiment of a method of this invention.

FIG. 2 is a flowchart of an embodiment of a method of this invention;

The following steps are taken in following the sorting method used in OPC verification as mentioned in an embodiment of a method of this invention to calculate the overall characteristic values of patterns and to sort the patterns:

Step I, obtaining the size of the comparison area 101 for the pattern and extract the pattern boundaries for the patterns within the comparison area 101.

Figure 3:
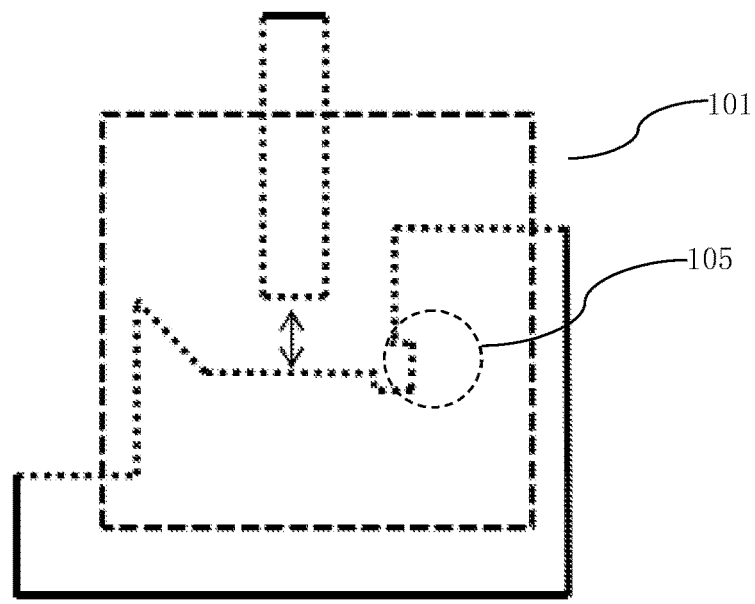
FIG. 3 is a schematic diagram for obtaining the comparison area for patterns as per Step I of an embodiment of a method of this invention.

FIG. 3 is a schematic diagram for obtaining the comparison area for patterns as per Step I of the embodiment method of this invention; the comparison area is marked by the short dashed line that corresponds with reference number "101".

In an embodiment of this invention, the size of the comparison area 101 for the pattern is obtained by taking the wrong point of the OPC verification as the center. The wrong point of the OPC verification in this technical field is the point where the deformation of the pattern is larger than a set standard and will result in component failures or performance degradation, during the chip production after simulation of models.

Preferably, the obtained comparison area for the patterns is a square or a rectangle obtained by taking the wrong point of OPC verification as the center.

The size of the obtained comparison area 101 for the patterns is set in accordance with different models of OPC verification. In the embodiment of this invention, the size of the obtained comparison area 101 for the patterns is a minimal rectangle containing the wrong point of OPC verification, plus a further outward extension of 1~2 µm.

Figure 4:
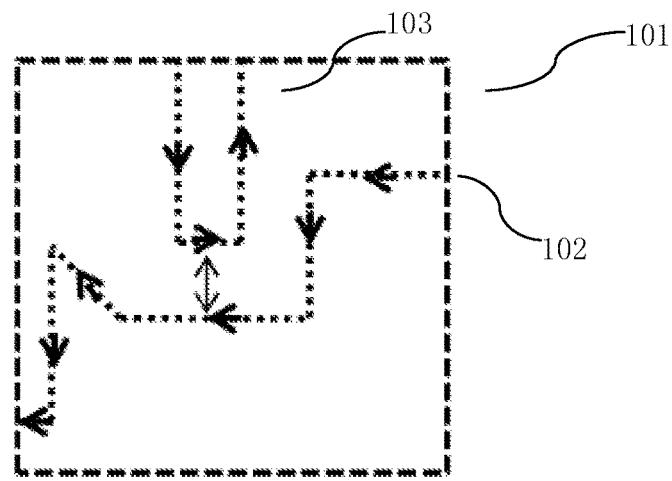
FIG. 4 is a schematic diagram for setting the direction of the pattern boundary in accordance with an embodiment of a method of this invention.

Step II, processing the pattern boundary within the comparison area 101 of the pattern, which includes the following substeps:

Substep 21, cutting off the edges of the pattern outside the comparison area 101. As shown in FIG. 4, all the edges of the pattern outside the comparison area 101 have been cut off.

Substep 22, setting filtering grid size so that the apexes of the boundaries of the patterns all move to the closest grid points with grid sizes that are multiples of the grid sizes; degenerating the grid points on the same straight line so as to filter all the deviations from the grid sizes. Preferably, the grid size is set to be tens of nanometers.

For example, when the size of the selected particles is 25 nm, and after setting the grid sizes, the apex of each boundary will move to the closest grid points with the grid sizes that are multiples of 25 nm.

Figure 5:
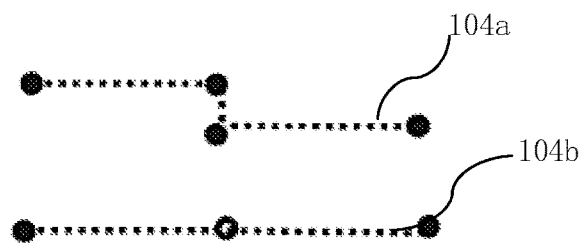
FIG. 5 is a schematic diagram for degenerating the grid points on the same straight line in accordance with an embodiment of a method of this invention.

Degenerate grid points on a straight line and retain only two points, i.e., the front-end point and the rear-end point. FIG. 5 is a schematic diagram for degenerating the grid points on the same straight line according to an embodiment of this invention; The polyline 104a is composed of two straight lines which are very close to each other and these two straight lines are only linked via the two points as shown in the middle of FIG. 5, which is equal to a straight line formed with subtle deviation. The distance between the two points in the middle of the polyline line 104a is smaller than the order of magnitude for the grid size. Therefore, in the embodiment of the present invention, the two straight lines of the polyline 104a are degenerated into one straight line 104b; the two middle points are removed from the straight line 104b, and only the front-end point and the rear-end point are retained thereon.

The subtle differences as shown within the frame of short dashed lines in FIG. 3 are completely eliminated in FIG. 4. Thus in the embodiment of this invention patterns having subtle differences with one another can be sorted.

Substep 23, set the directions for the boundaries of the patterns in accordance with same rules. The direction setting should ensure that the directions for the boundaries of all the patterns used in the OPC verification are set in accordance with the same rules, thereby the same type of patterns have the same overall characteristic values.

FIG. 4 shows setting each pattern boundary in anti-clockwise direction; For example, the direction of the pattern boundary sequence corresponding to reference number 102 starts from the starting edge where the sequence 102 intersects with the right side of comparison area 101; the direction of the starting edge is set to be anti-clockwise direction; The direction of each side of the pattern boundary sequence corresponding to reference number 102 extends along the anti-clockwise direction.

For the pattern boundary sequence corresponding to reference number 103, two sides of the sequence intersect with the top edge of the comparison area 101. After turning the comparison area clockwise for 90 degrees, the former top edge of the comparison area 101 has become the right edge thereof, and at this time, the starting edge of the sequence of pattern boundaries corresponding to reference number 103 has become the edge that is located on top and intersects with the right side of the comparison area 101; the direction of the starting edge is set to be the direction inward, i.e. the anti-clockwise direction; the direction of each side of the pattern boundary sequences corresponding to reference number 102 extends along the direction of the starting edges.

In other embodiments, the direction for each pattern boundary in Sub step 23 can also be set under the rule with clockwise direction towards inside of the pattern 3. Of course, it is necessary to ensure that the directions of the boundaries of all the patterns used in the OPC verification are set in accordance with the same rule. The direction shall be set either in clockwise direction or in anti-clockwise direction. It will not be accepted if some patterns are set in anti-clockwise direction while other patters are set in clockwise direction.

Figure 6:
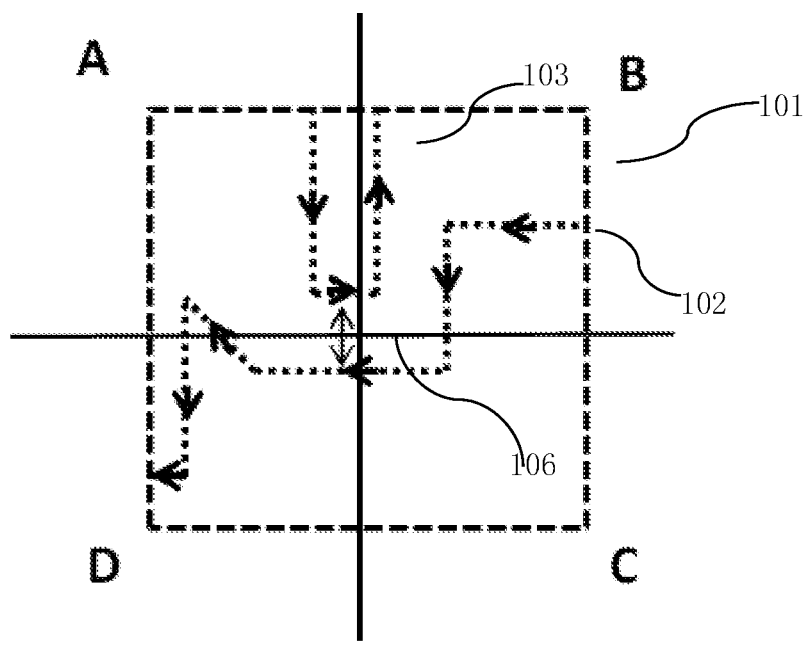
FIG. 6 is a schematic diagram for dividing a pattern into 4 blocks of an equal size according to an embodiment of a method of this invention.

Step III, partitioning the patterns after being processed by the boundary processing of Step II, which includes the following Substeps:

Substep 31, dividing the pattern into 4 blocks of an equal size. As shown in FIG. 6, the pattern after being processed by the boundary processing of Step II is divided into 4 blocks of an equal size, which are named A, B, C, D, and represent the upper left block, upper right block, bottom left block, and bottom right block, respectively.

Substep 32, recalculating the apex of the boundary for each the pattern in each block in accordance with the result of partitioning. As shown in FIG. 6, each pattern boundary intersecting with the two dividing lines in the middle is provided with a corresponding apex at the intersection point.

Substep 33, for each block, implementing the coordinate transformation by taking the center of partitioning in Substep 31 as the origin and shift the corresponding block into the first quadrant.

Taking FIG. 6 as an example, the coordinate transformation is explained as follows:

For Block B, as Block B is already located within the first quadrant, no coordinate transformation is necessary for Block B;

For Block A, it is necessary to turn Block A clockwise for 90 degrees so as to move Block A into the first quadrant;

For Block C, it is necessary to turn Block C anticlockwise for 90 degrees so as to move Block C into the first quadrant;

For Block D, it is necessary to turn Block D for 180 degrees so as to move Block D into the first quadrant;

Step IV, calculating the block characteristic value of each block that has completed coordinate transformation; the block characteristic value for each of the block is calculated in accordance with the apex coordinates of each pattern boundary as well as by adopting the method of being divided by prime and taking remainder, with the block characteristic value for each block consisting of two componential values.

In an embodiment of a method of this invention, the calculation of the block characteristic values includes the following substeps:

Substep 41, selecting the first prime and the second prime for division and remainder taking. Preferably, both the first prime and the second prime are large primes under twelve bit decimal system.

Substep 42, based on the starting point coordinates and the ending point coordinates of the pattern boundaries as well as the first prime and the second prime, calculating the characteristic values of the lines for the pattern boundaries in the blocks.

Preferably, the line characteristic values of the pattern boundaries as described in Substep 42 are calculated in accordance with the following formulae:

$$E1=[(X1+X2+a11\times(Y1+Y2)+a12+X1)\times(Y1+Y2+a13\times(X1+X2)+a14+Y1)]\%P; \qquad \text{Formula (1)};$$

$$E2=[(Y1+Y2+a15\times(Y1+Y2)+a16+X2)\times(Y1+Y2+a17\times(X1+X2)+a18+Y2)]\%Q; \qquad \text{Formula (2)};$$

wherein E1 represents the first componential value of the line characteristic value; E2 represents the second componential value of the line characteristic value; P represents the first prime; Q represents the second prime; X1 represents horizontal ordinate of the starting point for the corresponding line; Y1 represents vertical ordinate of the starting point for the corresponding line; X2 represents horizontal ordinate of the ending point for the corresponding line; Y2 represents vertical ordinate of the ending point for the corresponding line; a11, a12, a13, a14, a15, a16, a17 and a18 are all primes, different from one another, smaller than either of the first prime and the second prime, for instance, 11, 13, 17, 23, etc. can be substituted for a11~a18.

Substep 43, determining the number of the pattern boundaries for the corresponding blocks, and if there is only one line of the pattern boundaries, then the characteristic values of the line for this pattern boundary will be taken as the block characteristic values for the entire block; if there are over two lines of the pattern boundaries, then proceed by following Substep 44.

Substep 44, arranging the pattern boundaries into a sequence of lines in accordance with the rule as defined in Substep 23; by following the direction of the sequence of the lines, and in connection with the first prime and the second prime, successively incorporating the line characteristic values of the pattern boundaries of two adjacent lines into a single line characteristic value, and finally obtaining an overall line characteristic value and taking this overall line characteristic value as the block characteristic value of the entire block.

Preferably the Substep 44 of incorporating the line characteristic values of the pattern boundaries of two adjacent lines into a single line characteristic value includes the following:

The E1 and E2 values of the front pattern boundary are taken as X1 and Y1, respectively. The E1 and E2 values of the rear pattern boundary are taken as X2 and Y2, respectively. Substitute the above converted X1, Y1, X2 and Y2 into the following formulae:

$$E1=[(X1+X2+a21\times(Y1+Y2)+a22+X1)\times(Y1+Y2+a23\times(X1+X2)+a24+Y1)]\%P; \quad \text{Formula (3)};$$

$$E2=[(Y1+Y2+a25\times(Y1+Y2)+a26+X2)\times(Y1+Y2+a27\times(X1+X2)+a28+Y2)]\%Q; \quad \text{Formula (4)};$$

wherein E1 represents the first componential value of the line characteristic value after incorporation; E2 represents the second componential value of the line characteristic value after incorporation; a21, a22, a23, a24, a25, a26, a27 and a28 are all primes, different from one another, smaller than either of the first prime and the second prime; the values of a21, a22, a23, a24, a25, a26, a27 and a28 are all different from those of a11, a12, a13, a14, a15, a16, a17 and a18, respectively.

The method of obtaining the line characteristic values of the complete line sequence by obtaining the line characteristic values of a single line can be explained in connection with FIG. 6. As shown in FIG. 6, the sequence of pattern boundaries corresponding to reference number 102 that falls within Block B after partitioning consists of two lines; the sequence of pattern boundaries corresponding to reference number 103 that falls within Block B after partitioning also consists of two lines. There are altogether 4 lines, which can be arranged into a sequence. For example, the starting line of 102 can be taken as the first line; the second line of 102 can be taken as the second line; the starting line of 103 can be taken as a third line; the second line of 103 can be taken as the fourth line. First, the line characteristic values corresponding to the two lines of the 102 can be calculated in accordance with formulae (3) and (4), thereby arriving at a first incorporated line characteristic value; secondly, combine the first incorporated line characteristic value of reference number 102 with the line characteristic value of the starting line of reference number 103, thereby arriving at a second incorporated line characteristic value; thirdly, combine the second incorporated line characteristic value with the line characteristic value of the second line of reference number 103, thereby arriving at a third incorporated line characteristic value. As there are altogether four lines in the sequence, three combinations will be adequate to incorporate the line characteristic values of the sequence of pattern boundaries within the entire Block B and the result of three combinations can be taken as the block characteristic value of Block B.

Step V, block adjustment, which includes: in accordance with the block characteristic values of said the four blocks and based on the array structure of the blocks divided by Substep 31, implementing the rotation, upward and downward mirroring or leftward and rightward mirroring, so as to sorting patterns related to each other by rotations or mirroring as well as patterns having minute differences with one another into a same category of patterns.

Figure 7:
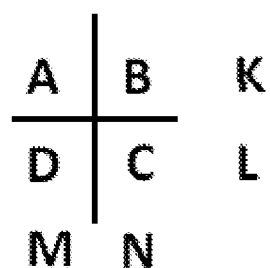
FIG. 7 is a schematic diagram for obtaining row values and column values according to an embodiment of a method of this invention.

The block adjustment includes the flowing sub steps:

Substep 51, the four blocks divided in accordance with and Substep 31 are the upper left block (Block A), upper right block (Block B), bottom right block (Block C) and bottom left block (Block D), respectively; as shown in FIGS. 7, A, B, C and D are directly used to represent the block characteristic values of corresponding blocks, and the block characteristic value for each block consists of two componential values, which are represented by A1, A2, B1, B2, C1, C2, D1 and D2, respectively.

The first row value is derived by adding the block characteristic values of both the upper left block and the upper right block, being divided by prime and taking the remainder; the second row value is derived by adding the block characteristic values of both the bottom left block and the bottom right block, being divided by prime and taking the remainder.

The first column value is derived by adding the block characteristic values of both the upper left block and the bottom left block, being divided by prime and, taking the remainder; the second column value is derived by adding the block characteristic values of both the upper right block and the bottom right block, being divided by prime and taking the remainder.

For seeking solutions regarding the row values and column values, specific explanations are given as follows:

As shown in FIG. 7, the first row value is represented by K, which comprises two componential values, represented by K1 and K2, respectively; K is the row value of A and B, and the two componential values of K can be derived by row addition, being divided by prime, and taking the remainder for the two componential values of A and B, respectively, which can be represented by the following formulae:

$$K1=(A1+B1)\%P;$$

$$K2=(A2+B2)\%Q.$$

Similarly, L is the row value of C and D, and also comprises two componential values, represented by L1 and L2, respectively, and the two componential values of L are derived by using the following formulae:

$$L1=(C1+D1)\%P;$$

$$L2=(C2+C2)\%Q.$$

Similarly, M is the column value of A and D, and also comprises two componential values, represented by M1 and M2, respectively, and the two componental values of M are derived by using the following formulae:

$$M1=(A1+D1)\%P;$$

$$M2=(A2+D2)\%Q.$$

Similarly, N is the column value of B and C, and also comprises two componental values, represented by N1 and N2, respectively, and the two componental values of N are derived by using the following formulae:

$$N1=(B1+B1)\%P;$$

$$N2=(B2+C2)\%Q.$$

Substep 52, if the smaller value of the said first row value and the said second row value is greater than the smaller value of the said first column value and the said second column value, then implement an anticlockwise rotation for the 4 blocks divided by in Substep 31. That is to say, if the smaller value of K1 and L1 is greater than the smaller value of both M1 and N1, then just rotate the matrix; if the smaller value of K1 and L1 is equal to the smaller value of M1 and N1, then compare the value of K2, L2 and M2, N2; the anticlockwise rotation for 90 degrees is applicable in this context. In other embodiments, it may also be as follows: if the smaller value of the first row value and the second row value is greater than the smaller value of the first column value and the second column value, then implement a clockwise rotation for the said 4 blocks. It is worth noting that so long as the anticlockwise rotation is selected for once, then the anticlockwise rotation is to be applied to all the other patterns; that if the clockwise rotation is selected for once, then the clockwise rotation is to be applied to all the other patterns; that it will not be accepted if some of the patterns select the anticlockwise rotation while the other patterns select the clockwise rotation.

Substep 53, if the first row value is smaller than the second row value, then implement an upward and downward mirroring transformation for the said 4 blocks. That is to say, if L1 is greater than K1, then implement an upward and downward mirroring transformation for the matrix. If L1 is equal to K1, then compare L2 with K2. In other embodiments, it may also be as follows: if the first row value is greater than the second row value, then implement an upward and downward mirroring transformation for the said 4 blocks. It is worth noting that if certain patterns subject to upward and downward mirroring transformation when the first row value is smaller than the second row value, then all the other patterns should also subject to upward and downward mirroring transformation whenever the first row value is smaller than the second row value; that if certain patterns subject to upward and downward mirroring transformation when the first row value is greater than the second row value, then all the other patterns should also subject to upward and downward mirroring transformation whenever the first row value is greater than the second row value; that it will not be accepted if some patterns subject to upward and downward mirroring transformation when the first row value is smaller than the second row value, while other patterns subject to upward and downward mirroring transformation when the first row value is greater than the second row value.

Substep 54, if the first column value is smaller than the second column value, then implement a leftward and rightward mirroring transformation for the said 4 blocks. That is to say, if N1 is greater than M1, then implement an upward and rightward mirroring transformation for the matrix. If N1 is equal to M1, then compare N2 with M2. In other embodiments, it may also be as follows: if the first column value is greater than the second column value, then implement a leftward and rightward mirroring transformation for the said 4 blocks. It is worth noting that if certain patterns subjected to leftward and rightward mirroring transformation when the first column value is smaller than the second column value, then all the other patterns should also subject to leftward and rightward mirroring transformation whenever the first column value is smaller than the second column value; that if certain patterns subject to leftward and rightward mirroring transformation when the first column value is greater than the second column value, then all the other patterns should also subject to leftward and rightward mirroring transformation whenever the first column value is greater than the second column value; that it will not be accepted if some patterns subject to leftward and rightward mirroring transformation when the first column value is smaller than the second column value, while the other patterns subject to leftward and rightward mirroring transformation when the first column value is greater than the second column value.

By implementing the block adjustment in accordance with an embodiment of a method of this invention, all the patterns that are related to each other by rotations or mirroring will have the same graphic structures, thus sorting the patterns related to each other by rotations or mirroring into the same categories.

Step VI, based on the calculation of the block characteristic values; obtain the overall characteristic values of the said patterns subjected to block adjustments.

Figure 8:
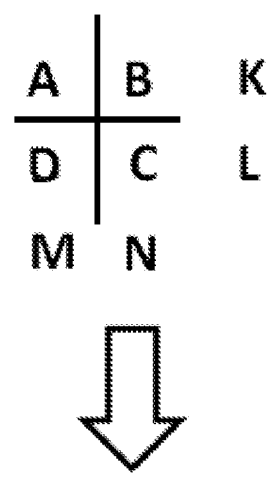
FIG. 8 is a schematic diagram for obtaining overall characteristic values as per an embodiment of a method of this invention.

In an embodiment of this invention, the calculation for the overall characteristic values of the patterns in Step VI is made by taking one of the 4 blocks as the starting block, along the clockwise direction, and in combination with the first prime and the second prime, the block characteristic values of two adjacent blocks are successively incorporated into a single block characteristic value and finally arriving at an overall block characteristic value to be taken as the overall characteristic values for said patterns. The steps of incorporating the block characteristic values of two adjacent blocks into a single block characteristic value in Step VI are the same as those of incorporating the line characteristic values of the pattern boundaries of two adjacent boundaries into a single line characteristic value. As shown in FIG. 7, Block D may be selected as the starting block, and on a clockwise basis, the second block will be Block A, the third block will be Block B, and the fourth block will be Block C. The first combination in the calculation for the overall characteristic values of the patterns is the combination between the block characteristic values of Block D and Block A, which generates the block characteristic value of the first combination. Secondly, combine the first block characteristic value of the first combination with the block characteristic value of Block B, which produces the block characteristic value of the second combination. Thirdly, combine the block characteristic values of the second combination with the block characteristic value of Block C, which produces the block characteristic values of the third combination. As there are altogether 4 blocks, three combinations will be adequate to arrive at the overall characteristic value of the said patterns. As shown in FIG. 8, the two componental values of the overall characteristic value are represented by G1 and G2, respectively. It is worth noting that so long as the starting block is selected for once in the calculation for the overall characteristic values, the block will be taken as the starting block for the entire pattern.

In other embodiments, it may be as follows: in the calculation for the overall characteristic values of the patterns as per Step VI, one of the four blocks is selected as the staring block, in the anticlockwise direction, and in combination with the first prime and the second prime, the block characteristic values of two adjacent blocks are successively incorporated into a single block characteristic value, and finally arrive at an overall block characteristic value as the overall characteristic value of the pattern. It is worth noting that in the calculation for the overall characteristic values, either the block characteristic values of all the patterns are combined on a clockwise basis, or they are combined on an anticlockwise basis. It will not be accepted if some of the block characteristic values of the patterns are combined on a clockwise basis, while some of the block characteristic values thereof are combined on an anticlockwise basis. Only in this way the overall characteristic values of the same patterns can be the same. Thus, in accordance with the embodiment method of this invention, the patterns with the same overall characteristic values are patterns of the same type. The OPC verification is implemented based on the patterns sorted in accordance with their overall characteristic values and an OPC verification is implemented a same type of patterns.

Specific embodiments of a method of this invention is described above in a detailed way; however, it does not constitute a restriction on the invention. Based on the same principle of this invention, many modifications and improvements can be made by those skilled in the art without departing from the principle of the invention, which is also regarded as in the protection scope of the invention.

What is claimed is:

1. A pattern sorting method used in OPC verification, comprising the following steps:
   Step I, obtaining the size of the comparison area for the patterns and extracting the pattern boundaries of said patterns within the comparison area;
   Step II, processing said pattern boundaries within said comparison areas for said patterns, which includes the following substeps:
   Substep 21, cutting off the edges of said patterns outside said comparison areas;
   Substep 22, setting of grid sizes for filtering so that the apexes of the boundaries of the said patterns all move to the closest grid points with the grid sizes that are multiples of said grid sizes; degenerating the grid points on the same straight line so as to filter all the deviations from said grid sizes;
   Substep 23, setting the directions for the boundaries of the said patterns in accordance with same rules;
   Step III, partitioning the said patterns having completed the boundary processing for the said patterns, which includes the following substeps:
   Substep 31, dividing the said pattern into four blocks of an equal size;
   Substep 32, recalculating the apex of the boundary for each said pattern in each block in accordance with the result of partitioning;
   Substep 33, for each block, implementing the coordinate transformation by taking the center of partitioning in Substep 31 as the origin and shift the corresponding block into the first quadrant;
   Step IV, calculating the block characteristic value of each block that has completed coordinate transformation; the said block characteristic value for each said block is calculated in accordance with the apex coordinates of each said pattern boundary as well as by adopting the method of being divided by prime and taking remainders, with the said block characteristic value for each said block comprising two componential values;
   Step V, block adjustment, which includes: in accordance with the characteristic values of the said blocks and based on the array structure of the blocks divided by Substep 31, implementing the rotation, upward and downward mirroring or leftward and rightward mirroring, so as to sorting patterns related to each other by rotations or mirroring, into the same categories of patterns; and
   Step VI, based on the calculation of the said block characteristic values, obtaining the overall characteristic values of the said patterns having completed block adjustments.

2. The pattern sorting method used in OPC verification of claim 1, wherein the size of the comparison area for said patterns as obtained in said Step I is obtained by taking the wrong point of OPC verification as the center.

3. The pattern sorting method used in OPC verification of claim 2, wherein the comparison area for said patterns as obtained in said Step I is a square or a rectangle obtained by taking the wrong point of OPC verification as the center.

4. The pattern sorting method used in OPC verification of claim 3, wherein the size of the comparison area for said patterns as obtained in said Step I is set according to different OPC models.

5. The pattern sorting method used in OPC verification of claim 4, wherein the size of the comparison area for said patterns as obtained in said Step I is the minimal rectangle containing the said wrong point of OPC verification, plus a further outward extension of 1~2 μm.

6. The pattern sorting method used in OPC verification of claim 5, wherein the grid size as mentioned in Substep 22 is set to be tens of nanometers.

7. The pattern sorting method used in OPC verification of claim 1, wherein in Substep 23, the direction of the boundary of the said pattern is set in anti-clockwise direction; or in Substep 23, the direction of the boundary of the said pattern is set in clockwise direction.

8. The pattern sorting method used in OPC verification of claim 1, wherein the calculation of the characteristic values of said blocks in said Step IV includes the following substeps:
   Substep 41, selecting a first prime and a second prime for division and remainder taking;
   Substep 42, based on the starting point coordinates and the ending point coordinates of the said pattern boundaries as well as the said first prime and the said second prime, calculating the characteristic values of the lines for the said pattern boundaries in said blocks;
   Substep 43, determining the number of said pattern boundaries for corresponding said blocks, and if there is only one line of said pattern boundaries, then the characteristic values of the line for this pattern boundary will be taken as the said block characteristic values for the entire said block; if there are over two lines of said pattern boundaries, then proceed by following Substep 44;
   Substep 44, arranging the said pattern boundaries into sequences of lines in accordance with the rule as defined in Substep 23; by following the direction of the sequence of said lines, and in combination with the said first prime and the said second prime, successively incorporating the line characteristic values of said pattern boundaries of two adjacent lines into a single line characteristic value, and finally obtaining an overall line characteristic value and taking this overall line characteristic value as the said block characteristic value of the entire said block.

9. The pattern sorting method used in OPC verification of claim 8, wherein the calculation of the said line characteristic values for the said pattern boundaries as mentioned in said Substep 42 is made by the following formulae:

$$E1=[(X1+X2+a11\times(Y1+Y2)+a12+X1)\times(Y1+Y2+a13\times(X1+X2)+a14+Y1)]\%P;$$

$$E2=[(Y1+Y2+a15\times(Y1+Y2)+a16+X2)\times(Y1+Y2+a17\times(X1+X2)+a18+Y2)]\%Q;$$

wherein E1 represents a first componential value of the said line characteristic value; E2 represents a second componential value of the said line characteristic value; P represents the first prime; Q represents the second prime; X1 represents a horizontal ordinate of the starting point for the corresponding line; Y1 represents a vertical ordinate of the starting point for the corresponding line; X2 represents a horizontal ordinate of the ending point for the corresponding line; Y2 represents a vertical ordinate of the ending point for the corresponding line; a11, a12, a13, a14, a15, a16, a17 and a18 are all primes, different from one another, smaller than either of the first prime and the second prime.

10. The pattern sorting method used in OPC verification of claim 9, wherein the specific steps of incorporating the line characteristic values of said pattern boundaries of two adjacent lines into a single line characteristic value in accordance with said Substep 44 include:
taking the values of E1 and E2 of a previous pattern boundary as X1 and Y1, respectively;
taking the values of E1 and E2 of a subsequent pattern boundary as X2 and Y2, respectively; substitute the converted values of X1, Y1, X2 and Y2 into the following formulae:

$$E1=[(X1+X2+a21\times(Y1+Y2)+a22+X1)\times(Y1+Y2+a23\times(X1+X2)+a24+Y1)]\% P;$$

$$E2=[(Y1+Y2+a25\times(Y1+Y2)+a26+X2)\times(Y1+Y2+a27\times(X1+X2)+a28+Y2)]\%Q;$$

wherein E1 represents the first componential value of the said line characteristic value after incorporation; E2 represents the second componential value of the said line characteristic value after incorporation; a21, a22, a23, a24, a25, a26, a27 and a28 are all primes, different from one another, smaller than either of the first prime and the second prime; the values of a21, a22, a23, a24, a25, a26, a27 and a28 are all different from those of a11, a12, a13, a14, a15, a16, a17 and a18, respectively.

11. The pattern sorting method used in OPC verification of claim 10, wherein when calculating the overall characteristic value of the said pattern as mentioned in said Step VI, one of the four blocks is taken as the starting block; by following the clockwise direction, and in combination with the said first prime and the said second prime, the said block characteristic values of two adjacent blocks are successively incorporated into a single block characteristic value; and finally arriving at an overall block characteristic value as the overall characteristic value of the said pattern; or
wherein when calculating the overall characteristic value of the said pattern as mentioned in said Step VI, one of the four blocks is taken as the starting block; by following the anticlockwise direction, and in combination with the said first prime and the said second prime, the said block characteristic values of two adjacent blocks are successively incorporated into a single said block characteristic value; and finally arrive at an overall said block characteristic value to be taken as the overall characteristic value for the said pattern.

12. The pattern sorting method used in OPC verification of claim 11, wherein the steps of incorporating the said block characteristic values of two adjacent blocks into a single said block characteristic value as mentioned in said Step VI are the same with those of incorporating the line characteristic values of said pattern boundaries of two adjacent lines into a single line characteristic value as mentioned in said Substep 44.

13. The pattern sorting method used in OPC verification of claim 8, wherein both the said first prime and the said second prime as mentioned in said Substep 41 are large primes under 12-bit decimal system.

14. The pattern sorting method used in OPC verification of claim 8, wherein the block adjustment as mentioned in said Step V comprises the following substeps:
Substep 51, the four blocks divided in accordance with and Substep 31 are the upper left block, upper right block, bottom right block and bottom left block, respectively; the first row value is derived by adding the block characteristic values of both the upper left block and the upper right block, being divided by prime and taking the remainder; the second row value is derived by adding the block characteristic values of both the bottom left block and the bottom right block, being divided by prime and taking the remainder; the first column value is derived by adding the block characteristic values of both the upper left block and the bottom left block, being divided by prime and taking the remainder; the second column value is derived by adding the block characteristic values of both the upper right block and the bottom right block, being divided by prime and taking the remainder;
Substep 52, if the smaller value of both the said first row value and the said second row value is greater than the smaller value of both the said first column value and the said second column value, then an 90 degree anticlockwise rotation for the 4 blocks divided by following Substep 31 is implemented; or
if the smaller value of both the said first row value and the said second row value is greater than the smaller value of both the said first column value and the said second column value, then a 90 degree clockwise rotation for the said 4 blocks is implemented;
Substep 53, if the said first row value is smaller than the said second row value, then an upward and downward mirroring transformation for the said 4 blocks is implemented; or
if the said first row value is greater than the said second row value, then an upward and downward mirroring transformation for the said 4 blocks is implemented;
Substep 54, if the said first column value is smaller than the said second column value, then a leftward and rightward mirroring transformation for the said 4 blocks is implemented; or,
if the said first column value is greater than the said second column value, then a leftward and rightward mirroring transformation for the said 4 blocks is implemented.

15. The pattern sorting method used in OPC verification of claim 1, wherein the patterns with the same overall characteristic values are classified into a same type of patterns and that the OPC verification is implemented based on the patterns sorted in accordance with their overall characteristic values and an OPC verification is implemented for a same type of patterns.

16. The pattern sorting method used in OPC verification of claim 2, wherein in Substep 23, the direction of the boundary of the said pattern is set in anti-clockwise direction; or in Substep 23, the direction of the boundary of the said pattern is set in clockwise direction.

17. The pattern sorting method used in OPC verification of claim 3, wherein in Substep 23, the direction of the boundary of the said pattern is set in anti-clockwise direction, or in Substep 23, the direction of the boundary of the said pattern is set in clockwise direction.

18. The pattern sorting method used in OPC verification of claim 9, wherein both the said first prime and the said second prime as mentioned in said Substep 41 are large primes under 12-bit decimal system.

19. The pattern sorting method used in OPC verification of claim 9, wherein the block adjustment as mentioned in said Step V comprises the following Substeps:

Substep 51, the four blocks divided in accordance with and Substep 31 are the upper left block, upper right block, bottom right block and bottom left block, respectively; the first row value is derived by adding the block characteristic values of both the upper left block and the upper right block, being divided by prime and taking the remainder; the second row value is derived by adding the block characteristic values of both the bottom left block and the bottom right block, being divided by prime and taking the remainder; the first column value is derived by adding the block characteristic values of both the upper left block and the bottom left block, being divided by prime and taking the remainder; the second column value is derived by adding the block characteristic values of both the upper right block and the bottom right block, being divided by prime and taking the remainder;

Substep 52, if the smaller value of both the said first row value and the said second row value is greater than the smaller value of both the said first column value and the said second column value, then an anticlockwise rotation for the 4 blocks divided by following Substep 31 is implemented; or if the smaller value of both the said first row value and the said second row value is greater than the smaller value of both the said first column value and the said second column value, then a clockwise rotation for the said 4 blocks is implemented;

Substep 53, if the said first row value is smaller than the said second row value, then an upward and downward mirroring transformation for the said 4 blocks is implemented; or if the said first row value is greater than the said second row value, then an upward and downward mirroring transformation for the said 4 blocks is implemented;

Substep 54, if the said first column value is smaller than the said second column value, then a leftward and rightward mirroring transformation for the said 4 blocks is implemented; or if the said first column value is greater than the said second column value, then a leftward and rightward mirroring transformation for the said 4 blocks is implemented.

20. The pattern sorting method used in OPC verification of claim 10, wherein the block adjustment as mentioned in said Step V comprises the following Substeps:

Substep 51, the four blocks divided in accordance with and Substep 31 are the upper left block, upper right block, bottom right block and bottom left block, respectively, The first row value is derived by adding the block characteristic values of both the upper left block and the upper right block, being divided by prime and taking the remainder; the second row value is derived by adding the block characteristic values of both the bottom left block and the bottom right block, being divided by prime and taking the remainder; the first column value is derived by adding the block characteristic values of both the upper left block and the bottom left block, being divided by prime and taking the remainder; the second column value is derived by adding the block characteristic values of both the upper right block and the bottom right block, being divided by prime and taking the remainder;

Substep 52, if the smaller value of both the said first row value and the said second row value is greater than the smaller value of both the said first column value and the said second column value, then an anticlockwise rotation for the 4 blocks divided by following Substep 31 is implemented; or if the smaller value of both the said first row value and the said second row value is greater than the smaller value of both the said first column value and the said second column value, then a clockwise rotation for the said 4 blocks is implemented;

Substep 53, if the said first row value is smaller than the said second row value, then an upward and downward mirroring transformation for the said 4 blocks is implemented; or if the said first row value is greater than the said second row value, then an upward and downward mirroring transformation for the said 4 blocks is implemented;

Substep 54, if the said first column value is smaller than the said second column value, then a leftward and rightward mirroring transformation for the said 4 blocks is implemented; or if the said first column value is greater than the said second column value, then a leftward and rightward mirroring transformation for the said 4 blocks is implemented.

* * * * *